May 23, 1944.  R. B. AIMAN  2,349,240
ADJUSTABLE MULTIPLE SPINDLE DRILL HEAD
Filed Aug. 15, 1942  4 Sheets-Sheet 1
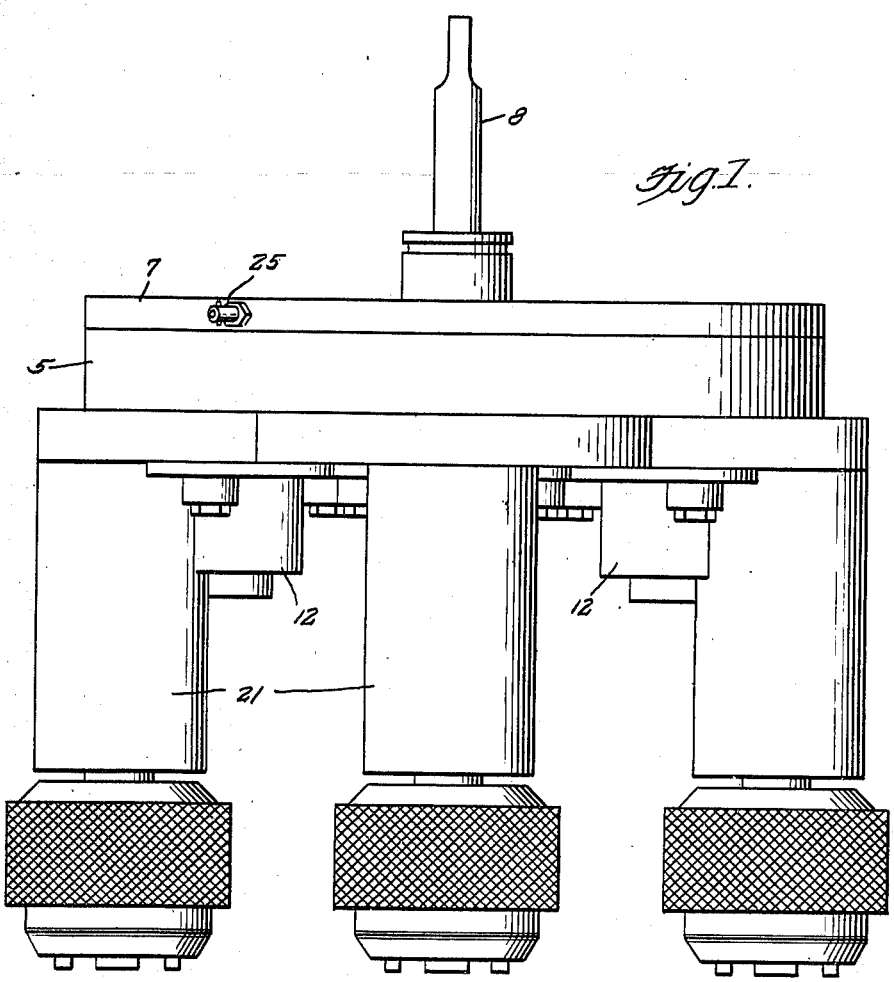
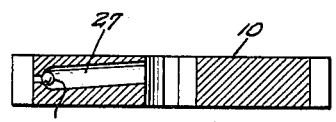
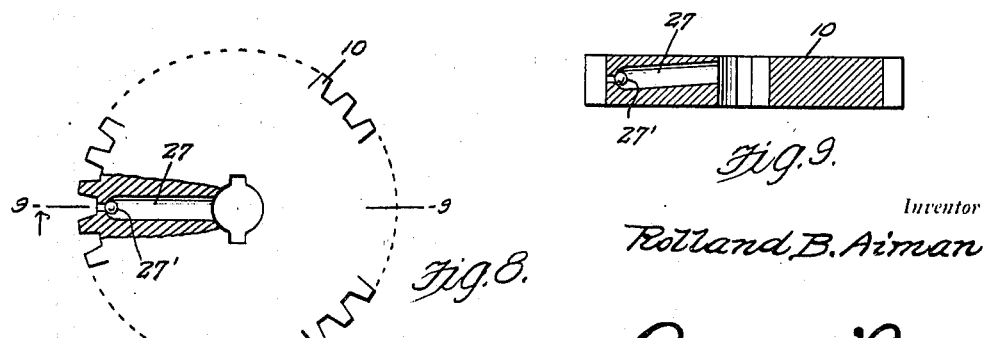
Inventor
Rolland B. Aiman
By Clarence A. O'Brien
and Harvey B. Jacobson
Attorneys May 23, 1944.  R. B. AIMAN  2,349,240
ADJUSTABLE MULTIPLE SPINDLE DRILL HEAD
Filed Aug. 15, 1942  4 Sheets-Sheet 2
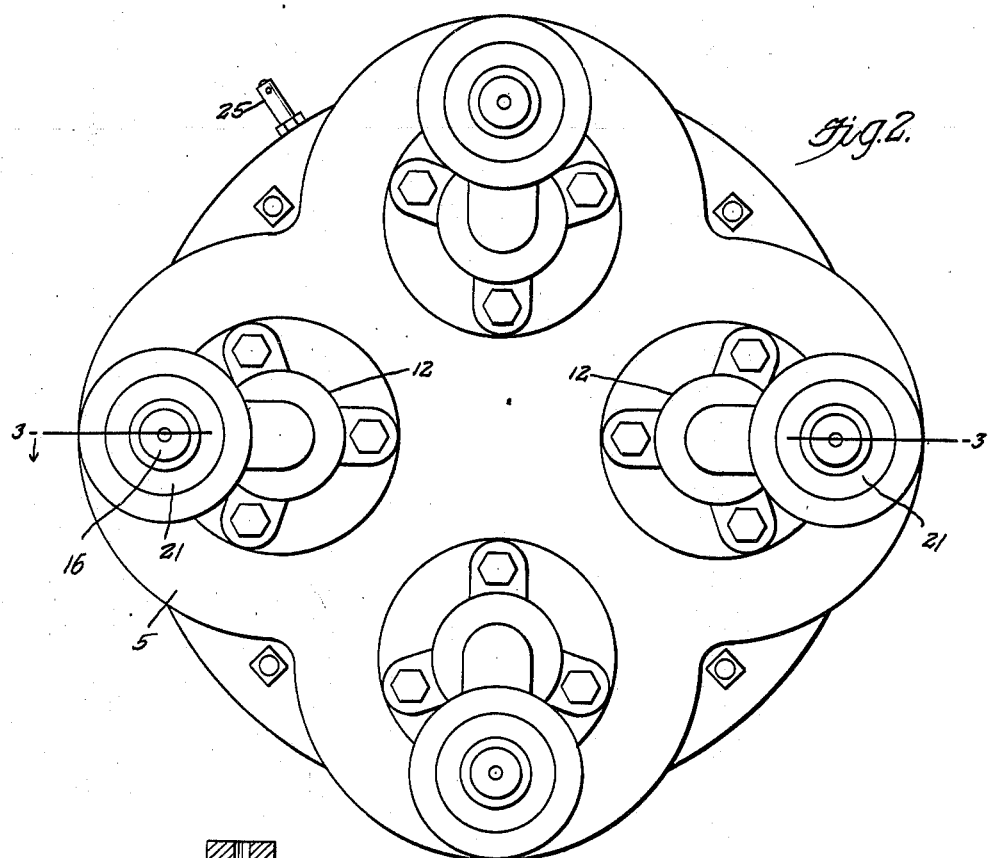
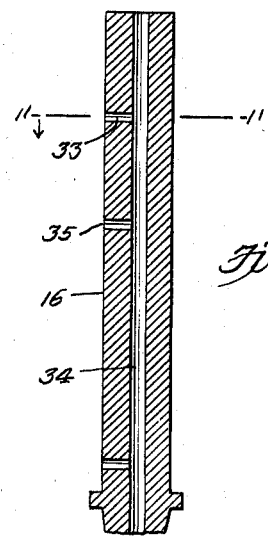
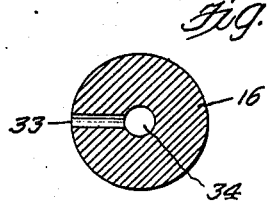
Inventor
Rolland B Aiman
By Clarence A. O'Brien
and Harvey B. Jacobson
Attorneys May 23, 1944. R. B. AIMAN 2,349,240
ADJUSTABLE MULTIPLE SPINDLE DRILL HEAD
Filed Aug. 15, 1942 4 Sheets-Sheet 3
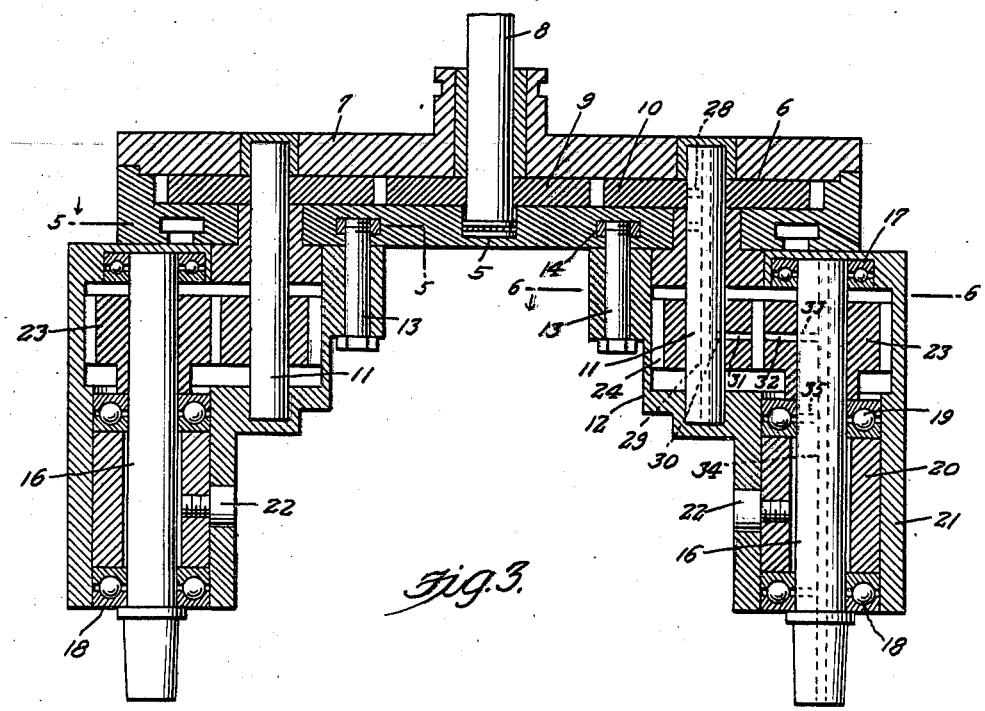
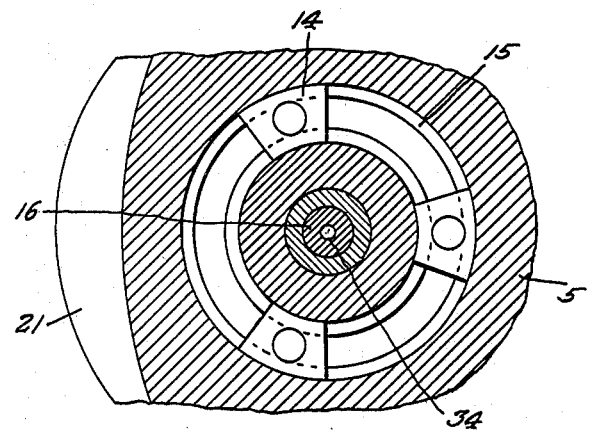
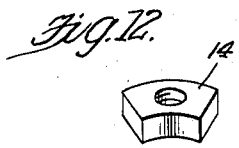
Inventor
Rolland B Aiman
By Clarence A O'Brien
and Harvey B Jackson
Attorneys May 23, 1944.   R. B. AIMAN   2,349,240
ADJUSTABLE MULTIPLE SPINDLE DRILL HEAD
Filed Aug. 15, 1942   4 Sheets-Sheet 4
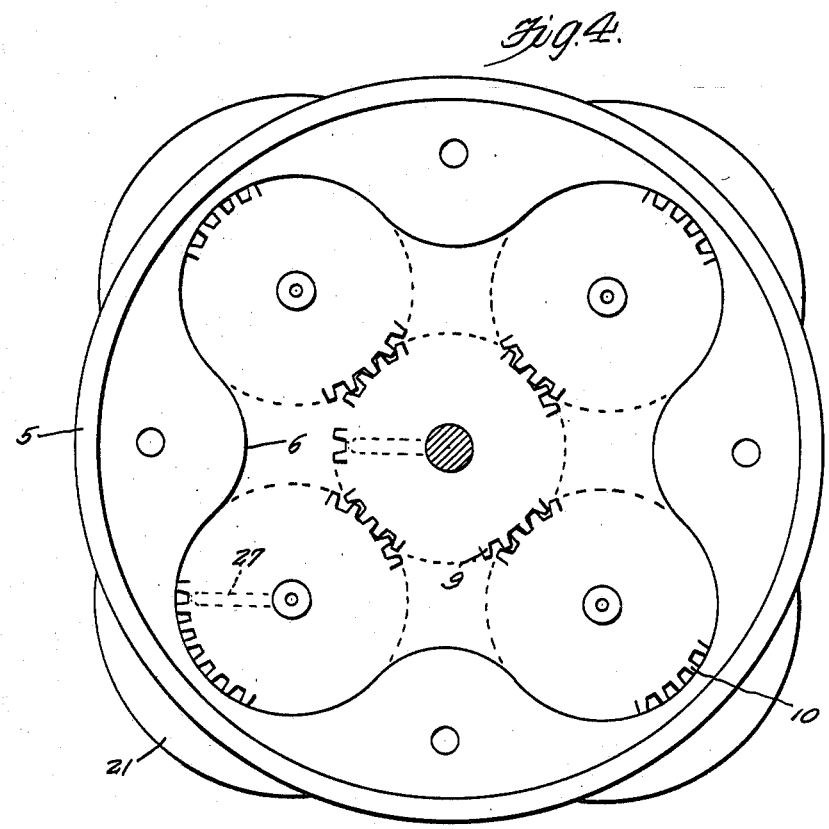
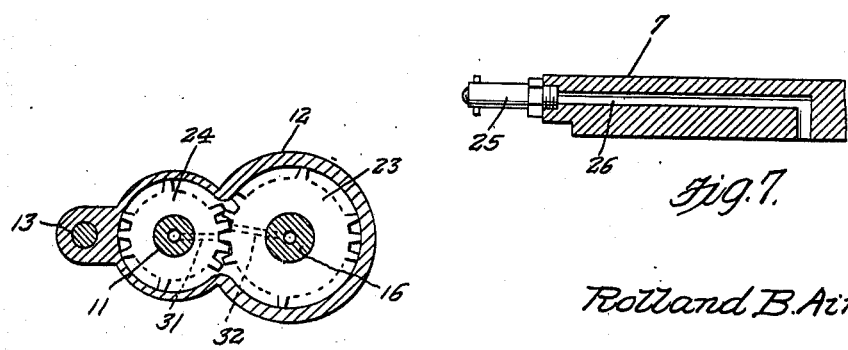
Inventor
Rolland B. Aiman
By Clarence A. O'Brien
and Harvey B. Jacobson
Attorneys Patented May 23, 1944

2,349,240

UNITED STATES PATENT OFFICE 2,349,240

ADJUSTABLE MULTIPLE SPINDLE DRILL HEAD

Rolland B. Aiman, Pendleton, Ind.

Application August 15, 1942, Serial No. 454,979

3 Claims. (Cl. 74—389)

The present invention relates to new and useful improvements in multiple drill heads and has particular reference to that class of drill heads having a multiplicity of adjustable drills, bits or other boring tools that may be operated in synchronism from a single master driven spindle.

An important object of the present invention is to provide novel means for lubricating the bearings of the several spindles of the tools.

A further object is to provide means for easily and quickly adjusting the tools circumferentially in the head.

Another object is to provide a drill head of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which:

Figure 1 is a side elevational view.

Figure 2 is a bottom plan view.

Figure 3 is a vertical sectional view taken substantially on a line 3—3 of Figure 2.

Figure 4 is a top plan view with the cap removed.

Figures 5 and 6 are fragmentary sectional views taken respectively on the lines 5—5 and 6—6 of Figure 3.

Figure 7 is a fragmentary sectional view of the grease supply passage in the head.

Figure 8 is a detail of one of the gears partly broken away and showing the grease passage therein.

Figure 9 is a sectional view taken on a line 9—9 of Figure 8.

Figure 10 is a vertical sectional view of one of the spindles.

Figure 11 is a transverse sectional view taken on a line 11—11 of Figure 10, and Figure 12 is a perspective view of one of the adjusting nuts for the shafts.

Referring now to the drawings in detail wherein for the purpose of illustration I have disclosed a preferred embodiment of my invention, the numeral 5 designates a circular body having a recess 6 in its upper surface to form a gear chamber which is closed by a cap 7.

Journaled in the cap is a drive spindle or shaft 8 adapted for driving engagement with a drill press (not shown) and secured to the lower end of the spindle 8 is a spur gear 9 positioned in the chamber 6. Also positioned in the chamber 6 are a plurality of gears 10 engaging the gear 9, each of the gears 10 being secured to a shaft 11 journaled in the body and projecting downwardly therefrom into a spindle housing 12.

One of the housings 12 is provided for each shaft 11 and the housings are secured to the under side of the body 5 by means of bolts 13 threaded into units 14 of arcuate form and slidably positioned in an annular channel 15 of T-shape in cross section, as shown in Figure 3, the channel being concentric with respect to the shaft 11.

A spindle 16 is journaled in each housing 12 by means of upper and lower bearing assemblies 17 and 18 and an intermediate bearing assembly 19, the bearings 18 and 19 being maintained in spaced relation by a sleeve 20 secured in a tubular portion 21 of the housing by a set screw 22.

Between the upper and intermediate bearings is a gear 23 secured to the spindle and engaging a gear 24 secured on the lower end of the shaft 11.

The spindles 16 of each housing may be adjusted relative to each other and circumferentially with respect to their associated shafts by the bolts 13 and the slidable nuts 14 in the channels 15.

A grease fitting 25 is connected to a grease passage 26 in the cap 7, the passage leading to the gear chamber 6.

The gears 10 are provided with a radially extending grease passage 27 having a ball check valve 27' therein and extending inwardly from a point between the teeth of the gear to the center thereof and communicating with a lateral passage 28 in the shaft 11 which leads to a longitudinal passage 29 and then to a lower lateral passage 30 into a passage 31 in the gear 24. The grease is then forced into a radial passage 32 in the gear 23 which communicates with a lateral passage 33 in the spindle 16 to a longitudinal passage 34 from which lateral passages 35 extend to the several bearing assemblies. The passage 34 also extends through both ends of the spindle to lubricate the tool attached thereto.

From the foregoing it will be apparent the spindles may be adjusted relative to each other in the annular channels 15 through the use of the bolts 13 and nuts 14.

It is believed the details of construction, advantages and manner of use of the device will be readily understood from the foregoing without further detailed explanation.

Having described the invention, what I claim as new is:

1. A multiple drill head comprising a body, a drive spindle journaled in the body, a plurality of shafts projecting from the body, means in the body operatively connecting the shafts to the spindle, a housing for the lower end of each shaft and pivoted about the axis of the shaft, a driven spindle projecting from each housing, gears operatively connecting the shafts with their respective driven spindles, and means for securing the housings in pivotally adjusted position to the body.

2. A multiple drill head comprising a body, a drive spindle journaled in the body, a plurality of driven shafts projecting from the body, means in the body operatively connecting the shafts to the spindle, a gear housing pivoted on each shaft, driven spindles in the housings parallel to the shafts, and bolts extending upwardly from the housing in the body for securing the driven spindles in circumferentially adjusted position relative to the shafts.

3. A multiple drill head comprising a body, a drive spindle journaled in the body, a plurality of driven shafts projecting from the body, means in the body operatively connecting the shafts to the spindle, a T-shaped annular channel in the underside of the body surrounding each shaft, a gear housing pivoted on each shaft, driven spindles projecting from the housings and operatively connected to the respective shafts, and attaching means for the housings adjustably positioned in the channels.

ROLLAND B. AIMAN.